US011128369B2

(12) United States Patent
Wei et al.

(10) Patent No.: US 11,128,369 B2
(45) Date of Patent: Sep. 21, 2021

(54) METHOD AND APPARATUS FOR HANDLING BWP SWITCHING IN RANDOM ACCESS PROCEDURE

(71) Applicant: FG Innovation Company Limited, Tuen Mun (HK)

(72) Inventors: Chia-Hung Wei, Hsinchu (TW); Chie-Ming Chou, Hsinchu (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 32 days.

(21) Appl. No.: 16/670,404

(22) Filed: Oct. 31, 2019

(65) Prior Publication Data

US 2020/0145089 A1    May 7, 2020

Related U.S. Application Data

(60) Provisional application No. 62/754,136, filed on Nov. 1, 2018.

(51) Int. Cl.
*H04B 7/08* (2006.01)
*H04W 74/08* (2009.01)
(Continued)

(52) U.S. Cl.
CPC ........... *H04B 7/088* (2013.01); *H04L 5/0092* (2013.01); *H04W 72/0453* (2013.01);
(Continued)

(58) Field of Classification Search
None
See application file for complete search history.

(56) References Cited

U.S. PATENT DOCUMENTS

2018/0324867 A1*  11/2018  Basu Mallick ... H04W 72/1284
2019/0037566 A1*  1/2019  Zhang ................ H04L 5/0007
(Continued)

FOREIGN PATENT DOCUMENTS

CN    107371195 A    11/2017
CN    106961731 A    7/2018

OTHER PUBLICATIONS

Interdigital Corrections on BWP switching for RA-BFR 3GPP, TSG-RAN WG2 Meeting NR AH 1807 R2-1809722, Jun. 21, 2018, chapter 5.15, 5.17.

(Continued)

*Primary Examiner* — Chi H Pham
*Assistant Examiner* — Vladislav Y Agureyev
(74) *Attorney, Agent, or Firm* — ScienBiziP, P.C.

(57) ABSTRACT

A method for random access performed by a MAC entity of a UE is provided. The method includes: receiving a first beam failure recovery configuration of a first UL BWP; receiving a second beam failure recovery configuration of a second UL BWP; initiating a first RA procedure on the first UL BWP by applying at least one first RA parameter configured in the first beam failure recovery configuration, when a number of beam failure instances that have been received from lower layers is larger than or equal to a threshold; switching an active UL BWP of the UE from the first UL BWP to a second UL BWP before completion of the first RA procedure; and initiating a second RA procedure on the second UL BWP by applying at least one second RA parameter configured in the second beam failure recovery configuration, after switching to the second UL BWP.

10 Claims, 5 Drawing Sheets

(51) Int. Cl.
  *H04W 76/27*  (2018.01)
  *H04W 72/04*  (2009.01)
  *H04W 80/02*  (2009.01)
  *H04L 5/00*   (2006.01)

(52) U.S. Cl.
  CPC ....... *H04W 74/0833* (2013.01); *H04W 76/27* (2018.02); *H04W 80/02* (2013.01)

(56) References Cited

U.S. PATENT DOCUMENTS

| | | | |
|---|---|---|---|
| 2019/0159261 A1* | 5/2019 | Jung | H04W 74/0833 |
| 2019/0190582 A1* | 6/2019 | Guo | H04B 7/0695 |
| 2019/0200396 A1* | 6/2019 | Agiwal | H04L 5/0098 |
| 2019/0306842 A1* | 10/2019 | Cirik | H04B 7/0617 |
| 2019/0313437 A1* | 10/2019 | Jung | H04L 5/0042 |
| 2019/0319833 A1* | 10/2019 | Nagaraja | H04B 7/0695 |
| 2019/0357215 A1* | 11/2019 | Zhou | H04L 5/0053 |
| 2020/0008240 A1* | 1/2020 | Golitschek Edler von Elbwart | H04W 72/042 |
| 2020/0015236 A1* | 1/2020 | Kung | H04W 72/0413 |
| 2020/0053613 A1* | 2/2020 | Cirik | H04L 27/261 |
| 2020/0053779 A1* | 2/2020 | Jeon | H04L 1/0026 |
| 2020/0146054 A1* | 5/2020 | Jeon | H04L 5/0053 |

OTHER PUBLICATIONS

ITRI Correction to BFR procedure upon BWP switching 3GPP, TSG-RAN2 Meeting #103 R2-1812702, Aug. 10, 2018, pp. 1 and 3-6.

\* cited by examiner

METHOD AND APPARATUS FOR HANDLING BWP SWITCHING IN RANDOM ACCESS PROCEDURE

CROSS-REFERENCE TO RELATED APPLICATION(S)

The present application claims the benefit of and priority to a provisional U.S. Patent Application Ser. No. 62/754,136, filed on Nov. 1, 2018, entitled "Method of BWP Switching within Random Access Procedure," (hereinafter referred to as "US75367 application"). The disclosure of the US75367 application is hereby incorporated fully by reference into the present application.

FIELD

The present disclosure generally relates to wireless communication, and more particularly, to a Random Access (RA) procedure in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. In NR, an RA procedure may include actions, such as an RA procedure initialization, an RA resource selection, an RA preamble transmission, an RA response reception, and a contention resolution. In addition, in NR, a serving cell may be configured with one or multiple bandwidth parts (BWPs). During an ongoing RA procedure, a user equipment (UE) may switch its active BWP from one to another. Thus, there is a need in the industry for an improved and efficient mechanism for a UE to handle BWP switching during an ongoing RA procedure.

SUMMARY

The present disclosure is directed to a method for random access performed by a UE in the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive, by a Medium Access Control (MAC) entity of the UE, a first beam failure recovery configuration of a first uplink (UL) BWP; receive, by the MAC entity of the UE, a second beam failure recovery configuration of a second UL BWP; initiate, by the MAC entity of the UE, a first RA procedure on the first UL BWP by applying at least one first RA parameter configured in the first beam failure recovery configuration of the first UL BWP, when a number of beam failure instances that have been received from lower layers of the UE is larger than or equal to a threshold; switch, by the MAC entity of the UE, an active UL BWP of the UE from the first UL BWP to a second UL BWP before completion of the first RA procedure; and initiate, by the MAC entity of the UE, a second RA procedure on the second UL BWP by applying at least one second RA parameter configured in the second beam failure recovery configuration of the second UL BWP, after switching the active UL BWP of the UE to the second UL BWP.

According to another aspect of the present disclosure, a method for random access performed by a MAC entity of a UE is provided. The method includes: receiving a first beam failure recovery configuration of a first UL BWP; receiving a second beam failure recovery configuration of a second UL BWP; initiating a first RA procedure on the first UL BWP by applying at least one first RA parameter configured in the first beam failure recovery configuration of the first UL BWP, when a number of beam failure instances that have been received from lower layers of the UE is larger than or equal to a threshold; switching an active UL BWP of the UE from the first UL BWP to a second UL BWP before completion of the first RA procedure; and initiating a second RA procedure on the second UL BWP by applying at least one second RA parameter configured in the second beam failure recovery configuration of the second UL BWP, after switching the active UL BWP of the UE to the second UL BWP.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
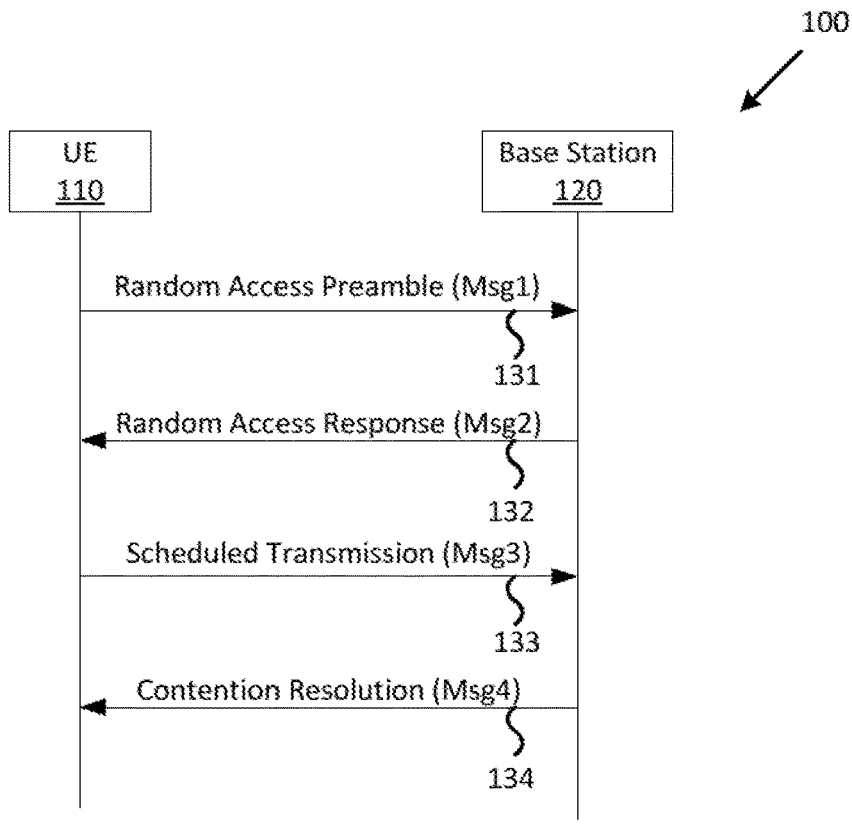
FIG. 1 is a diagram illustrating an example contention-based RA (CBRA) procedure, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

Because multi-beam operation may be supported in NR, an RA procedure in NR may be different from an RA procedure in Long Term Evolution (LTE). For example, before an RA is initiated, a base station (e.g., gNB) may provide to a UE, through system information, association information between synchronization signal blocks (SSBs) and one or more Random Access Channel (RACH) resources. The base station may also provide, to the UE, a reference signal received power (RSRP) threshold for SSB selection. After the RA is initiated, during the step of RA resource selection, the UE may perform DL reference signal (e.g., SSB, or Channel State Information Reference Signal (CSI-RS)) measurement for beam selection.

In NR, the RA procedure may be triggered by one or more of the following events, including:
   initial access from a radio resource control (RRC) idle state (RRC_IDLE);
   RRC Connection Re-establishment procedure;
   Handover (HO);
   DL or UL data arrival during RRC connected state (RRC_CONNECTED) when UL synchronization status is "non-synchronized":
   transition from RRC_INACTIVE;
   establishing time alignment at Secondary Cell (SCell) addition;
   request for other system information; and
   beam failure recovery (BFR).

Based on whether an RA preamble transmitted by the UE has a possibility of colliding with another UE's transmitted preamble or not, there may be two types of RA: contention-based RA (CBRA) and contention-free RA (CFRA). A normal DL/UL transmission may take place after completion of an RA procedure.

FIG. 1 is a diagram 100 illustrating an example CBRA procedure, according to an example implementation of the present application. A CBRA procedure may also be referred to as a 4-step Random Access Channel (RACH) procedure. In action 131, UE 110 transmits a Message 1 (Msg1) to base station 120. The Msg1 may include a Random Access (RA) preamble transmitted on a Physical Random Access Channel (PRACH). In action 132, base station 120 transmits a message 2 (Msg2), which may include a Random Access Response (RAR), to UE 110. The Msg2 may carry resource allocation information, such as a UL grant, for a message 3 (Msg3) transmission. After UE 110 successfully decodes the RAR, in action 133, UE 110 sends the Msg3 on the granted resource to base station 120. The Msg3 may include an RRC message, such as an RRC connection request message. The Msg3 may be a MAC PDU carrying data that is received from an upper layer on a Common Control Channel (CCCH). During the RA procedure, the Msg3 may be stored in a Msg3 buffer to prevent loss of the data received from the upper layer on the CCCH. In action 134, base station 120 sends a message 4 (Msg4) to UE 110. The Msg4 may include a contention resolution MAC Control Element (CE).

Figure 2:
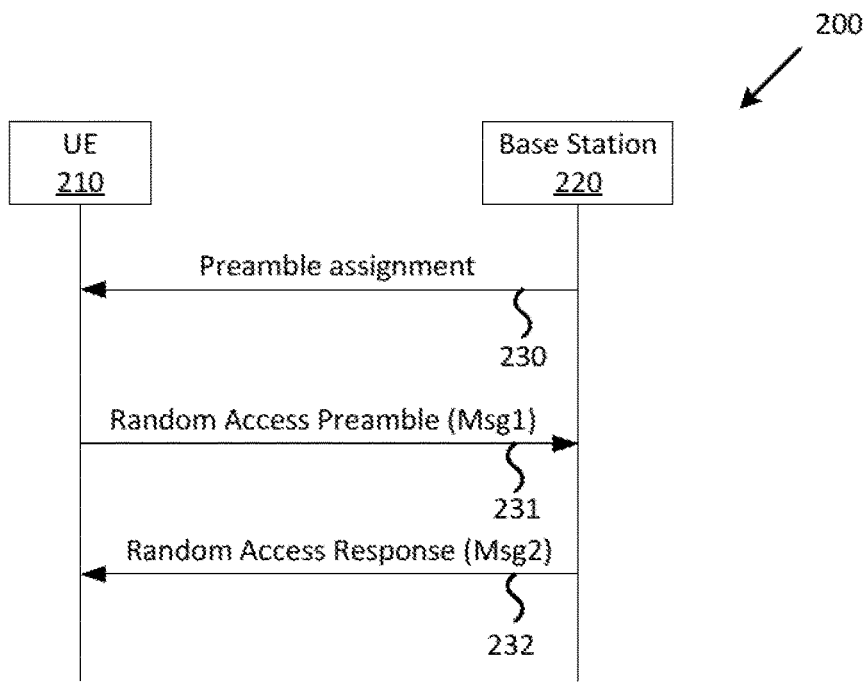
FIG. 2 is a diagram illustrating an example contention-free RA (CFRA) procedure, according to an example implementation of the present application.

FIG. 2 is a diagram 200 illustrating an example CFRA procedure, according to an example implementation of the present application. A CFRA procedure may also be referred to as a 2-step RACH procedure. In action 230, base station 220 assigns a preamble to UE 210. In action 231, UE 210 transmits a Msg1 to base station 220. In action 232, base station 220 transmits a Msg2, which may include an RAR, to UE 210.

In NR, before each preamble transmission or retransmission (e.g., including the first preamble transmission and the preamble retransmission after each random back off) within an RA procedure, a UE may perform an RA resource selection. During the RA resource selection, there may be two types of RA resources: a CBRA resource (e.g., the random access preamble is selected by a MAC entity from one or more contention-based random access preambles) and a CFRA resource (e.g., the random access preamble is not selected by the MAC entity from one or more contention-based random access preambles). It should be noted that the CFRA resource may not be necessarily configured to the UE by a base station (e.g., a gNB). If the CFRA resource is configured by the base station, the UE may prioritize the CFRA resource. In one implementation, the UE may select the CBRA resource only when the SSB (or CSI-RS) measurement associated with the CFRA resource does not satisfy an RSRP threshold. In one implementation, the UE may select either the CBRA resource or the CFRA resource when both the SSB (or CSI-RS) measurements associated with the CBRA resource and the CFRA resource fail to satisfy the RSRP threshold.

In one implementation, if the RA procedure is initiated for BFR, a UE may not select the CFRA resource if a beam failure recovery timer (e.g., parameter beamFailureRecoveryTimer) is configured but is not running. The UE may be configured, by the base station through the RRC layer, with BWP specific BFR configuration (e.g., BeamFailureRecoveryConfig information element (IE)). Each BFR configuration may include a set of RA parameters, which may be related to an RA procedure triggered by BFR. The set of RA parameters configured in the BFR configuration may include:
   rsrp-ThresholdSSB (e.g., an RSRP threshold for the selection of the SSB);
   rsrp-ThresholdCSI-RS (e.g., an RSRP threshold for the selection of CSI-RS);
   powerRampingStep (e.g., the power-ramping factor);
   powerRampingStepHighPriority (e.g., the power-ramping factor in case of prioritized RA procedure);
   preambleReceivedTargetPower (e.g., initial RA Preamble power);
   preambleTransMax (e.g., the maximum number of RA Preamble transmission);
   scalingFactorBI (e.g., a scaling factor for prioritized RA procedure);
   ssb-perRACH-Occasion (e.g., the number of SSBs mapped to each PRACH occasion);
   ra-ResponseWindow (e.g., the time window to monitor RA response(s));
   prach-ConfigurationIndex (e.g., the available set of PRACH occasions for the transmission of the RA Preamble);

ra-ssb-OccasionMaskIndex (e.g., PRACH occasion(s) associated with an SSB in which the MAC entity may transmit an RA Preamble); and ra-OccasionList (e.g., PRACH occasion(s) associated with a CSI-RS in which the MAC entity may transmit an RA Preamble).

It should be noted that these RA parameters configured by a base station may be used in not only an RA triggered by BFR but also an RA triggered by other events. In one implementation, a UE may be configured with multiple configurations (e.g., values) of these RA parameters, with each configuration corresponding to a different RA purpose. For example, RA initiated for different purposes may be configured with different configurations. In one implementation, the UE may be configured with a configuration for BFR and another configuration for initial access. Based on the purpose of an RA procedure, the UE may choose a corresponding configuration of these RA parameters.

In NR, a serving cell may be configured with one or more BWPs. In one implementation, a UE may activate one UL BWP and one DL BWP simultaneously for each configured serving cell, and the UE may switch an active BWP. The BWP switching for a serving cell may be used to activate an inactive BWP and deactivate an active BWP simultaneously. The BWP switching may be controlled by a Physical Downlink Control Channel (PDCCH) indicating a downlink assignment or an uplink grant, by a BWP inactivity timer (e.g., a parameter bwnp-InactivitvTimer), by RRC signaling (e.g., (re-)configuration of BWP(s)), or by a MAC entity of the UE itself upon initiation of an RA procedure when the current active UL BWP is not configured with Physical Random Access Channel (PRACH) occasions (in this case, the UE may switch the active UL BWP to the BWP indicated by a parameter initialUplinkBWP configured by an RRC layer of the base station). The parameter bwp-InactivityTimer may be configured by the base station. The active BWP for the serving cell may be indicated by either RRC signaling or a PDCCH.

Case 1: RRC (Re-)Configuration for BWP Switching

In one implementation, upon reception of an RRC (re-)configuration for BWP switching for a serving cell while a RA procedure associated with that serving cell is ongoing in a MAC entity, the MAC entity may stop the ongoing RA procedure and initiate another RA procedure after performing the BWP switching. In the following description, the ongoing RA before the BWP switching may be referred to as "the stopped RA", and the RA initiated by the MAC entity after the BWP switching may be referred to as "the newly initiated RA". In one implementation, the BWP switching triggered by RRC signaling may only occur in the UL BWP, which means the DL BWP may not be switched. Hence, the reference signal configured for beam failure detection (BFD) may also not change. In one implementation, BFD may be performed in the MAC entity. The MAC entity may detect beam failure instance (BFI) indication received from the lower layers of the UE (e.g., a physical (PHY) layer of the UE) and count the number of received BFI (e.g., parameter BFI_COUNTER). In one implementation, the MAC entity may initiate an RA procedure for BFR when the number of beam failure instances that have been received from the lower layers is larger than or equal to a threshold (e.g., parameter beamFailureInstanceMaxCount).

In one implementation, if the ongoing RA before the BWP switching is for BFR, the RA procedure initiated by the MAC entity after the BWP switching may also be for BFR. Hence, RA parameters in a BFR configuration may be applied by the MAC entity for the newly initiated RA. In one implementation, the BFR configuration including the RA parameters may be configured by a base station per UL BWP, and the BFR configuration may only be applied by the MAC entity when the BFR procedure is triggered (e.g., when the number of beam failure instances received from the lower layers is larger than or equal to a predetermined threshold within a preconfigured time period). It should be noted that the base station may not configure the BFR configuration including the RA parameters for all the UL BWPs.

In one implementation, there may be multiple RA parameters configured for the BFR RA. Instructions to ask the UE to apply the BFR configuration for each of the RA parameters may be addressed in at least one of an RA initialization stage, a BWP operation procedure, and a Beam Failure Detection and Recovery procedure. In the following, several implementations are provided to address how a MAC entity applies a BFR configuration for each of the RA parameters for a newly initiated RA.

Case 1-1: In BWP Operation Procedure

Case 1-1-a: In one implementation, in a BWP operation procedure, a MAC entity of a UE may only apply a specific part of the RA parameters in the BFR configuration for the newly initiated RA. In one implementation, the specific part of RA parameters may include powerRampingStep, preambleReceivedTargetPower, and preambleTransMax. In one implementation, the specific part of RA parameters may include powerRampingStepHighPriority, which may be a power ramping step applied for a prioritized RA procedure. In one implementation, the specific part of RA parameters may include scalingFactorBI, which may be a scaling factor for a backoff indicator (BI). In one implementation, the specific part of LRA parameters may include only part of the RA parameters in the BFR configuration (e.g., only part of following parameters: rsrp-ThresholdSSB, rsrp-ThresholdCSI-RS, powerRampingStep, powerRampingStepHighPriority, preamnbleReceivedTargetPower, preambleTransMax, scalingFactorBI, ssb-perRACH-Occasion, ra-ResponseWindow, prach-ConfigurationIndex, ra-ssb-OccasionMaskIndex, and ra-OccasionList) or any other RA parameters introduced in the Technical Standard (TS) 38.321 and/or TS 38.331. The entire contents of TS 38.321 and TS 38.331 are hereby incorporated by reference.

In one implementation, upon reception of an RRC (re-)configuration for BWP switching for a serving cell while an RA procedure associated with that serving cell is ongoing in the MAC entity, the MAC entity may stop the ongoing RA procedure and initiate an RA procedure after performing the BWP switching. If the BWP switching is for a SpCell and a BFR configuration (e.g., BeamFailureRecoveryConfig) is configured for the active UL BWP, the newly initiated RA may be for beam failure recovery after performing the BWP switching. The MAC entity may apply the parameters powerRampingStep, preambleReceivedTargetPower, and preambleTransMax configured in BeamFailureRecoveryConfig for the newly initiated RA procedure. The SpCell may be a special cell, which may refer to a primary cell (PCell) in a master cell group or a primary secondary cell (PSCell) in a secondary cell group.

Case 1-1-b: In one implementation, the specific part of RA parameters may include all of the RA parameters rsrp-ThresholdSSB, rsrp-ThresholdCSI-RS, powerRampingStep, powerRampingStepHighPriority, preambleReceivedTargetPower, preambleTransMax, scalingFactorBI, ssb-perRACH-Occasion, ra-ResponseWindow, prach-ConfigurationIndex, ra-ssb-OccasionMaskIndex, and ra-OccasionList.

In one implementation, upon reception of an RRC (re-) configuration for BWP switching for a serving cell while an RA procedure associated with that serving cell is ongoing in the MAC entity, the MAC entity may stop the ongoing RA procedure and initiate an RA procedure after performing the BWP switching. If the BWP switching is for SpCell and a BFR configuration (e.g., BeamFailureRecoveryConfig IE) is configured for the active UL BWP, the MAC entity may initiate an RA procedure after performing the BWP switching and the newly initiated RA procedure may be for beam failure recovery. The MAC entity may apply the RA parameters/configurations configured in BeamFailureRecoveryConfig for the newly initiated RA procedure.

Case 1-1-c: In one implementation, in the BWP operation procedure, the MAC entity may keep the purpose of the newly initiated RA the same as the purpose of the stopped RA.

In one implementation, upon reception of an RRC (re-) configuration for BWP switching for a serving cell while an RA procedure associated with that serving cell is ongoing in the MAC entity, the MAC entity may stop the ongoing RA procedure and initiate an RA procedure after performing the BWP switching. If the RA procedure before performing the BWP switching (e.g., the stopped RA) is initiated for beam failure recovery, the RA procedure initiated after performing the BWP switching (e.g., the newly initiated RA) may also be for beam failure recovery.

In one implementation, upon reception of an RRC (re-) configuration for BWP switching for a serving cell while an RA procedure associated with that serving cell is ongoing in the MAC entity, the MAC entity may stop the ongoing RA procedure and initiate an RA procedure after performing the BWP switching. The purpose of the RA procedure after performing the BWP switching (e.g., the newly initiated RA) may be kept the same as the purpose of the RA before the BWP switching (e.g., the stopped RA).

Case 1-1-d: In one implementation, if PRACH occasions are not configured for the active UL BWP, a MAC entity of a UE may switch the active UL BWP to an initial UL BWP (e.g., a BWP indicated by a parameter initialUplinkBWP). The MAC entity may initiate an RA procedure after the BWP switching (e.g., the newly initiated RA). The newly initiated RA may be performed on the initial UL BWP. The MAC entity may apply the BFR configuration (e.g., BeamFailureRecoveryConfig) of the initial UL BWP for the newly initiated RA procedure. In one implementation, if the BFR configuration is not configured for the initial UL BWP, the newly initiated RA performed by the MAC entity may be just a CBRA, but the purpose of the CBRA may still be BFR.

In one implementation, upon reception of an RRC (re-) configuration for BWP switching for a serving cell while an RA procedure associated with that serving cell is ongoing in the MAC entity, the MAC entity may stop the ongoing RA procedure and initiate an RA procedure after performing the BWP switching. If the BWP switching is for SpCell and a BFR configuration (e.g., BeamFailureRecoveryConfig IE) is configured for the active UL BWP, the LMAC entity may initiate an RA procedure after performing the BWP switching and the newly initiated RA procedure may be for beam failure recovery. The MAC entity may apply the parameters powerRampingStep, preambleReceivedTargetPower, and preambleTransMax configured in BeamFailureRecoveryConfig for the newly initiated RA procedure. If PRACH occasions are not configured for the active UL BWP, the MAC entity may switch the active UL BWP to a BWP indicated by a parameter initialUplinkBWP. The newly initiated RA procedure after BWP switching may be performed on the initialUplinkBWP, and the MAC entity may apply the parameters powerRampingStep, preambleReceivedTargetPower, and preambleTransMax configured in BeamFailureRecoveryConfig of the initialUplinkBWP. If the BFR configuration is not configured for the initial UL BWP, the MAC entity may perform CBRA for the newly initiated RA procedure.

In one implementation, upon reception of an RRC (re-) configuration for BWP switching for a serving cell while an RA procedure associated with that serving cell is ongoing in the MAC entity, the MAC entity may stop the ongoing RA procedure and initiate an RA procedure after performing the BWP switching. If the BWP switching is for SpCell and a BFR configuration (e.g., BeamFailureRecoveryConfig IE) is configured for the active UL BWP, the MAC entity may initiate an RA procedure after performing the BWP switching and the newly initiated RA procedure may be for beam failure recovery. The MAC entity may apply the parameters/configurations configured in BeamFailureRecoveryConfig for the newly initiated RA procedure. If PRACH occasions are not configured for the active UL BWP, the MAC entity may switch the active UL BWP to a BWP indicated by a parameter initialUplinkBWP. The newly initiated RA procedure after BWP switching may be performed on the initialUplinkBwP, and the MAC entity may apply the parameters/configurations configured in BeamFailureRecoveryConfig of the initialUplinkBWP.

Case 1-2: in BFD and BFR Procedure

A MAC entity of a UE may apply RA parameters in a BFR configuration for the newly initiated RA procedure in BFD and BFR procedure. In one implementation, because a beam failure recovery timer (e.g., a parameter beamFailureRecoveryTimer) may be configured per UL BWP, a MAC entity of a UE may also apply the configuration for the beam failure recover timer configured for the new active UL BWP.

Case 1-2-a: In one implementation, in the BFD and BFR procedure, a MAC entity of a UE may only apply a specific part of the RA parameters in the BFR configuration for the newly initiated RA. In one implementation, the specific part of RA parameters may include powerRampingStep, preambleReceivedTargetPower, and preambleTransMax. In one implementation, the specific part of RA parameters may include powerRampingStepHighPriority. In one implementation, the specific part of RA parameters may include scalingFactorBI.

In one implementation, a method performed by a MAC entity of a UE may be as described in the following Table 1:

TABLE 1

The MAC entity may:
1> if beam failure instance indication has been received from lower layers:
    2> start or restart the beamFailureDetectionTimer;
    2> increment BFI_COUNTER by 1;
    2> if BFI_COUNTER >= beamFailureInstanceMaxCount:
        3> initiate a Random Access procedure on the SpCell.
1> if a Random Access procedure for the beam failure recovery is initiated upon reception of RRC (re-)configuration for BWP switching for the SpCell:

TABLE 1-continued

2> if BeamFailureRecoveryConfig is configured for the active UL BWP:
    3> (re)start the beamFailureRecoveryTimer, if configured;
    3> apply the parameters powerRampingStep, preambleReceivedTargetPower, and preambleTransMax configured in BeamFailureRecoveryConfig for the Random Access procedure.

Case 1-2-b: In one implementation, the specific part of RA parameters may include all of the RA parameters (e.g., rsrp-ThresholdSSB, rsrp-ThresholdCSI-RS, powerRampingStep, powerRampingStepHighPriority, preambleReceivedTargetPower, preambleTransMax, scalingFactorBI, ssb-perRACH-Occasion, ra-ResponseWindow, prach-ConfigurationIndex, ra-ssb-OccasionMaskIndex, and ra-OccasionList) or any other RA parameters introduced in the TS 38.321 and/or TS 38.331.

In one implementation, a method performed by a MAC entity of a UE may be as described in the following Table 2:

Table 2

TABLE 2

The MAC entity may:
2> if beam failure instance indication has been received from lower layers:
    2> start or restart the beamFailureDetectionTimer;
    2> increment BFI_COUNTER by 1;
    2> if BFI_COUNTER >= beamFailureInstanceMaxCount:
        3> initiate a Random Access procedure on the SpCell.
1> if a Random Access procedure for the beam failure recovery is initiated upon reception of RRC (re-)configuration for BWP switching for the SpCell:
    2> if BeamFailureRecoveryConfig is configured for the active UL BWP:
        3> (re)start the beamFailureRecoveryTimer, if configured;
        3> apply the parameters/configurations configured in BeamFailureRecoveryConfig for the Random Access procedure.

Case 1-2-c: In one implementation, the specific part of RA parameters may include only part of the RA parameters (e.g., rsrp-ThresholdSSB, rsrp-ThresholdCSI-RS, powerRampingStep, powerRamnpingStepHighPriority, preambleReceivedTargetPower, preambleTransMax, scalingFactorBI, ssb-perRACH-Occasion, ra-ResponseWindow, prach-ConfigurationIndex, ra-ssb-OccasionMaskIndex, and ra-OccasionList) or any other RA parameters introduced in the TS 38.321 and/or TS 38.331.

Case 1-3: In RA Procedure Initialization

Case 1-3-a: In one implementation, in an RA procedure initialization stage, a MAC entity of a UE may apply specific RA parameters in a BFR configuration according to the purpose of the initiated RA procedure.

In one implementation, an RRC layer may configure following parameters for the RA procedure:
preambleReceivedTargetPower: initial Random Access Preamble power. If the Random Access procedure is initiated for beam failure recovery, the preambleReceivedTargetPower may refer to preambleReceivedTargetPower in BeamFailureRecoveryConfig IE;
powerRampingStep: the power-ramping factor. If the Random Access procedure is initiated for beam failure recovery, the powerRampingStep may refer to powerRampingStep in BeamFailureRecoveryConfig IE;
preambleTransMax: the maximum number of Random Access Preamble transmission. If the Random Access procedure is initiated for beam failure recovery, the preambleTransMax may refer to preambleTransMax in BeamFailureRecoveryConfig IE.

It should be noted that the parameters listed above are just exemplary rather than limiting. For example, the RRC layer may instead (or additionally) configure other previously listed RA parameters, such as powerRampingStepHighPriority, scalingFactorBI, or other RA parameters introduced in the TS 38.321 and/or TS 38.331.

Case 1-3-b: In one implementation, in the RA procedure initialization stage, the MAC entity may keep the purpose of the newly initiated RA the same as the purpose of the stopped RA.

Case 1-4: RRC Configuration

In one implementation, a UE may be asked to apply RA parameters in a configuration based on a purpose of triggering RA. In one implementation, when a base station configures a configuration for RA parameters, the configuration within an RRC message and IE may explicitly indicate that the configured RA parameters may be applied for a specific purpose of triggering RA. For example, within RACH-ConfigGeneric, RACH-ConfigCommon, RA-Prioritization or BeamFailureRecoveryConfig IE, the RRC message may explicitly indicate that the configuration may be applied for a specific purpose of RA (e.g., RA for BFR). Moreover, the RRC message may further explicitly indicate that some specific configured RA parameters may be applied for a specific purpose of RA (e.g., RA for BFR). In one implementation, the RRC message may explicitly indicate that only some specific configured RA parameters may be applied for a specific purpose of RA (e.g., RA for BFR).

Case 2: PDCCH for BWP Switching

In one implementation, if a MAC entity of a UE receives a PDCCH for BWP switching for a serving cell while an RA procedure associated with that serving cell is ongoing in the MAC entity, it may be up to UE implementation regarding whether to switch BWP or ignore the PDCCH for BWP switching. In one implementation, when the UE receives a PDCCH for BWP switching that is addressed to a Cell-Radio Network Temporary Identifier (C-RNTI) for successful RA procedure completion, the UE may perform BWP switching to a BWP indicated by the PDCCH. When the UE receives a PDCCH for BWP switching other than successful contention resolution, if the MAC entity of the UE decides to perform BWP switching, the MAC entity may stop the ongoing RA procedure and initiate an RA procedure after performing the BWP switching. If the MAC decides to ignore the PDCCH for BWP switching, the MAC entity may continue the ongoing RA procedure on the serving cell. In one implementation, if the MAC entity decides to perform BWP switching, the behavior corresponding to the newly initiated RA procedure may be similar to that introduced in various implementations in Case 1. The difference is that BWP switching in Case 1 may be triggered by RRC configuration, and BWP switching in Case 2 may be triggered by PDCCH.

In one implementation, if the MAC entity decides to perform BWP switching, the MAC entity may stop the ongoing RA procedure and initiate an RA procedure after performing the BWP switching. No matter whether the purpose of the stopped RA is for BFR or not, various implementations of the MAC entity in Case 1 may be logically adopted for BWP switching triggered by PDCCH in Case 2.

Case 3: Other Implementations

In one implementation, upon reception of an RRC (re-)configuration for BWP switching for the SpCell while an RA procedure for beam failure recovery is ongoing, a MAC entity of a UE may not initiate an RA procedure after the BWP switching. In one implementation, upon reception of an RRC (re-)configuration for BWP switching for the SpCell while an RA procedure for beam failure recovery is ongoing, the MAC entity may not initiate an RA procedure after the BWP switching if the DL BWP has been switched by the RRC (re-)configuration, and/or if the BFD/BFR/reference signal(s) (or signal set(s)) has been changed/updated/modified/reconfigured. In one implementation, the MAC entity may set the beam failure instance counter (e.g., a parameter BFI_COUNTER) to 0, stop the beamFailureRecoverTimer, and/or consider the BFR procedure successfully completed. Various implementations for the MAC entity within this disclosure may be logically adopted to UL BWP switching due to any kind of events (e.g., RRC signaling-based triggering, timer-based triggering or any downlink signaling).

Figure 3:
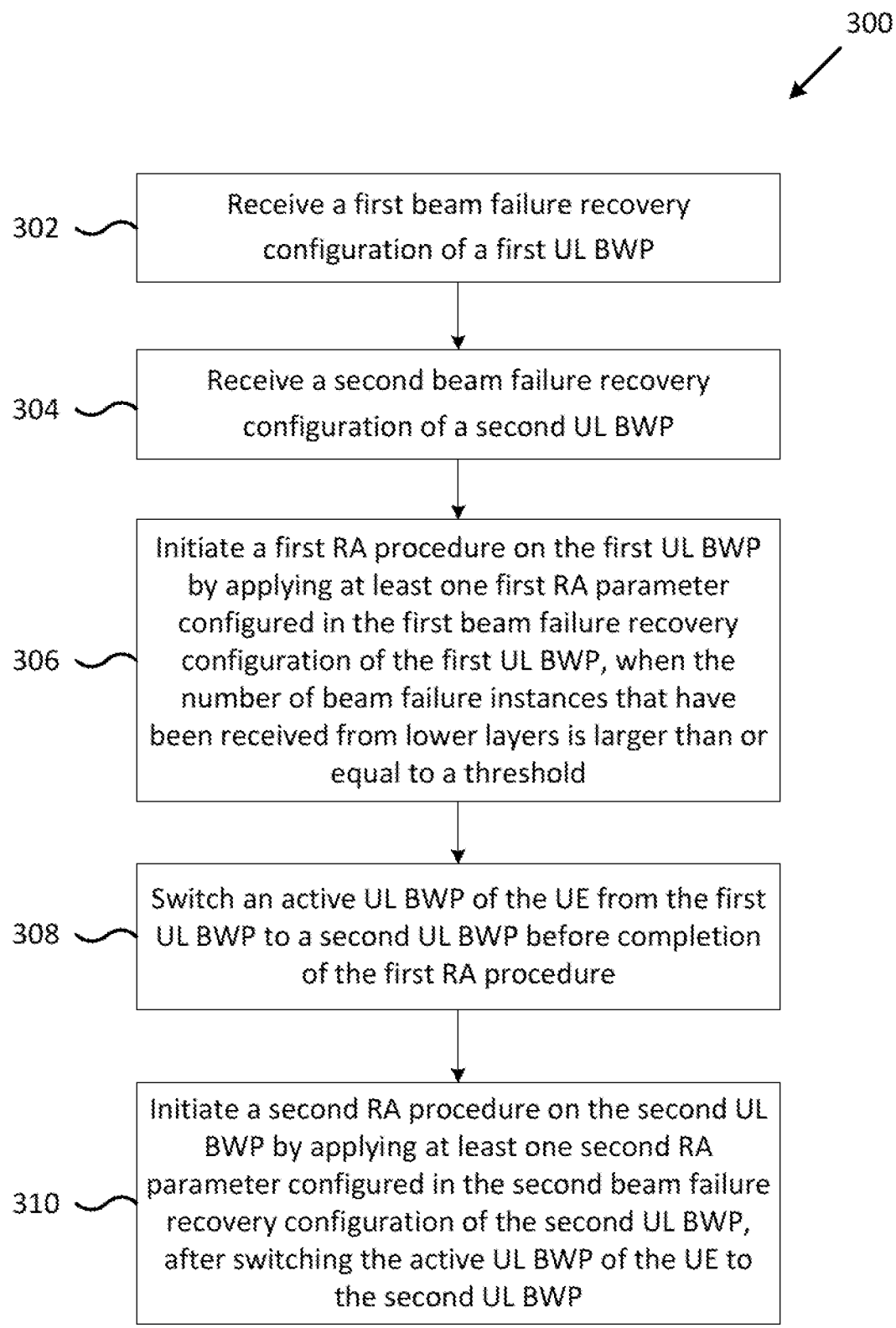
FIG. 3 is a flowchart of an example method performed by a MAC entity of a UE in an RA procedure, according to an example implementation of the present application.

FIG. 3 is a flowchart of an example method 300 performed by a MAC entity of a UE in an RA procedure, according to an example implementation of the present application. In action 302, the MAC entity may receive a first beam failure recovery configuration of a first UL BWP (e.g., BeamFailureRecoveryConfig #1). In action 304, the MAC entity may receive a second beam failure recovery configuration of a second UL BWP (e.g., BeamFailureRecoveryConfig #2). Each of the beam failure recovery configurations may be configured per UL BWP.

In action 306, the MAC entity may initiate a first RA procedure on the first UL BWP by applying at least one first RA parameter configured in the first beam failure recovery configuration of the first UL BWP (e.g., BeamFailureRecoveryConfig #1), when the number of beam failure instances (e.g., BFI_COUNTER) that have been received from the lower layers of the UE is larger than or equal to a threshold (e.g., beamFailureInstanceMaxCount). The first RA procedure may be for beam failure recovery. The at least one first RA parameter in the first beam failure recovery configuration may include at least one of following parameters: rsrp-ThresholdSSB, rsrp-ThresholdCSI-RS, powerRampingStep, powerRampingStepHighPriority preambleReceivedTargetPower, preamble TransMax, scalingFactorBI, ssb-perRACH-Occasion, ra-ResponseWindow, prach-ConfigurationIndex, m-ssb-OccasionMaskIndex, and ra-OccasionList.

In action 308, the MAC entity may switch an active UL BWP of the UE from the first UL BWP to a second UL BWP before completion of the first RA procedure. The BWP switching in action 308 may be triggered by a PDCCH indication, a BWP inactivity timer, an RRC signaling, or by the MAC entity itself when the first UL BWP is not configured with PRACH occasions.

In one implementation, the MAC entity may receive an RRC message for BWP switching before completion of the first RA procedure, and the MAC entity may stop the first RA procedure. BWP switching triggered by RRC signaling may be referred to the description of Case 1 above.

In action 310, the MAC entity may initiate a second RA procedure on the second UL BWP by applying at least one second RA parameter configured in the second beam failure recovery configuration of the second UL BWP (e.g., BemnFailureRecoveryConfig #2), after switching the active UL BWP of the UE to the second UL BWP. In one implementation, the at least one second RA parameter applied by the MAC entity may include powerRampingStep, preamnbleReceivedTargetPower, and preambleTransMax. In one implementation, the at least one second RA parameter applied by the MAC entity may include powerRampingStepHighPriority. In one implementation, the at least one second RA parameter applied by the MAC entity may include scalingFactorBI In one implementation, the at least one second RA parameter applied by the MAC entity may include part or all of the RA parameters rsrp-ThresholdSSB, rsrp-ThresholdCSI-RS, powerRampingStep, powerRampingStepHighPriority, preambleReceivedTargetPower, preamnbleTransMax, scalingFactorBI, ssb-perRACH-Occasion, ra-ResponseWindow, prach-ConfigurationIndex, ra-ssb-OccasionMaskIndex, and ra-OccasionList. The RA parameters applied for the newly initiated RA procedure (e.g., the second RA procedure) may be referred to the descriptions of Cases 1-1-a, 1-1-b, 1-2-a, 1-2-b, 1-2-c, and 1-3-a, above.

In one implementation, the first UL BWP is not configured with PRACH occasions, and the second UL BWP is an initial UL BWP of the UE (e.g., a BWP indicated by a parameter initialUplinkBWP). The related description may be found in Case 1-1-d.

Figure 4A:
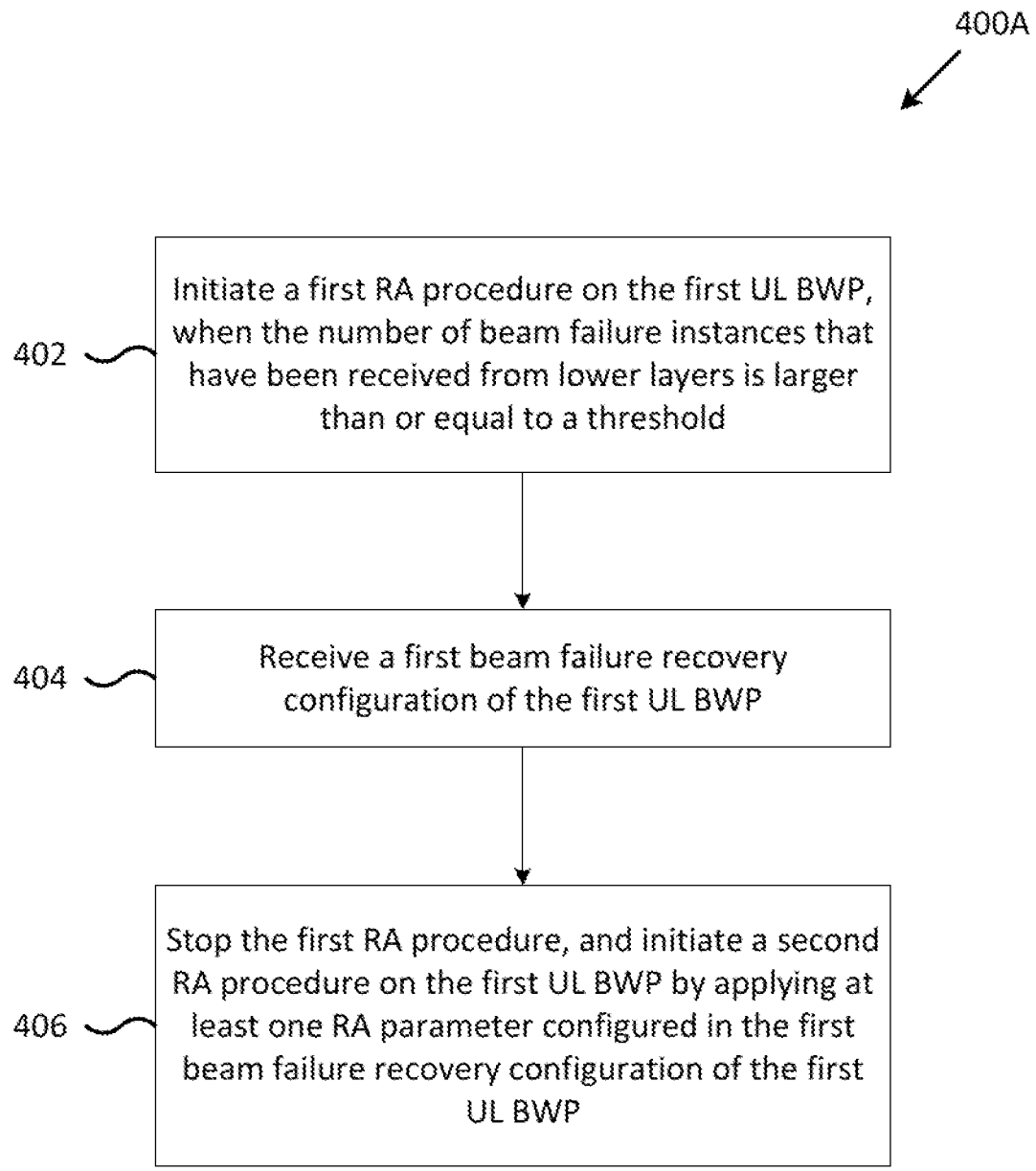
FIG. 4A is a flowchart of another example method performed by a MAC entity of a UE in an RA procedure, according to an example implementation of the present application.

FIG. 4A is a flowchart of another example method 400 performed by a MAC entity of a UE in an RA procedure, according to an example implementation of the present application. In action 402, the MAC entity may initiate a first RA procedure on the first UL BWP, when the number of beam failure instances (e.g., BFI_COUNTER) that have been received from the lower layers of the UE is larger than or equal to a threshold (e.g., beamFailureInstanceMaxCount). The first RA procedure may be for beam failure recovery. The UE may not be configured with a beam failure recovery configuration on the first UL BWP at this moment. In one implementation, the MAC entity may apply RA parameters configured in BWP-UplinkCommon IE, RACH-ConfigCommon IE, or RACH-ConfigGeneric IE, for the first RA procedure.

In action 404, before completion of the first RA procedure, the MAC entity of the UE may receive (e.g., from upper layers) a first beam recovery configuration of the first UL BWP (e.g., BeamFailureRecoveryConfig #1). The first beam recovery configuration may be configured by a base station during the first RA procedure.

In action 406, the MAC entity of the UE may stop the first RA procedure and initiate a second RA procedure on the first UL BWP by applying at least one RA parameter configured in the first beam failure recovery configuration of the first UL BWP. The at least one RA parameter in the first beam failure recovery configuration may include part or all of following parameters: rsrp-ThresholdSSB, rsrp-ThresholdCSI-RS, powerRampingStep, powerRampingStepHighPriority, preamnbleReceivedTarge:Power, preambleTransMax, scalingFactorB, ssb-perRACH-Occasion, ra-ResponseWindow, prach-ConfigurationIndex, ra-ssb-OccasionMaskIndex, and ra-OccasionList.

Figure 4B:
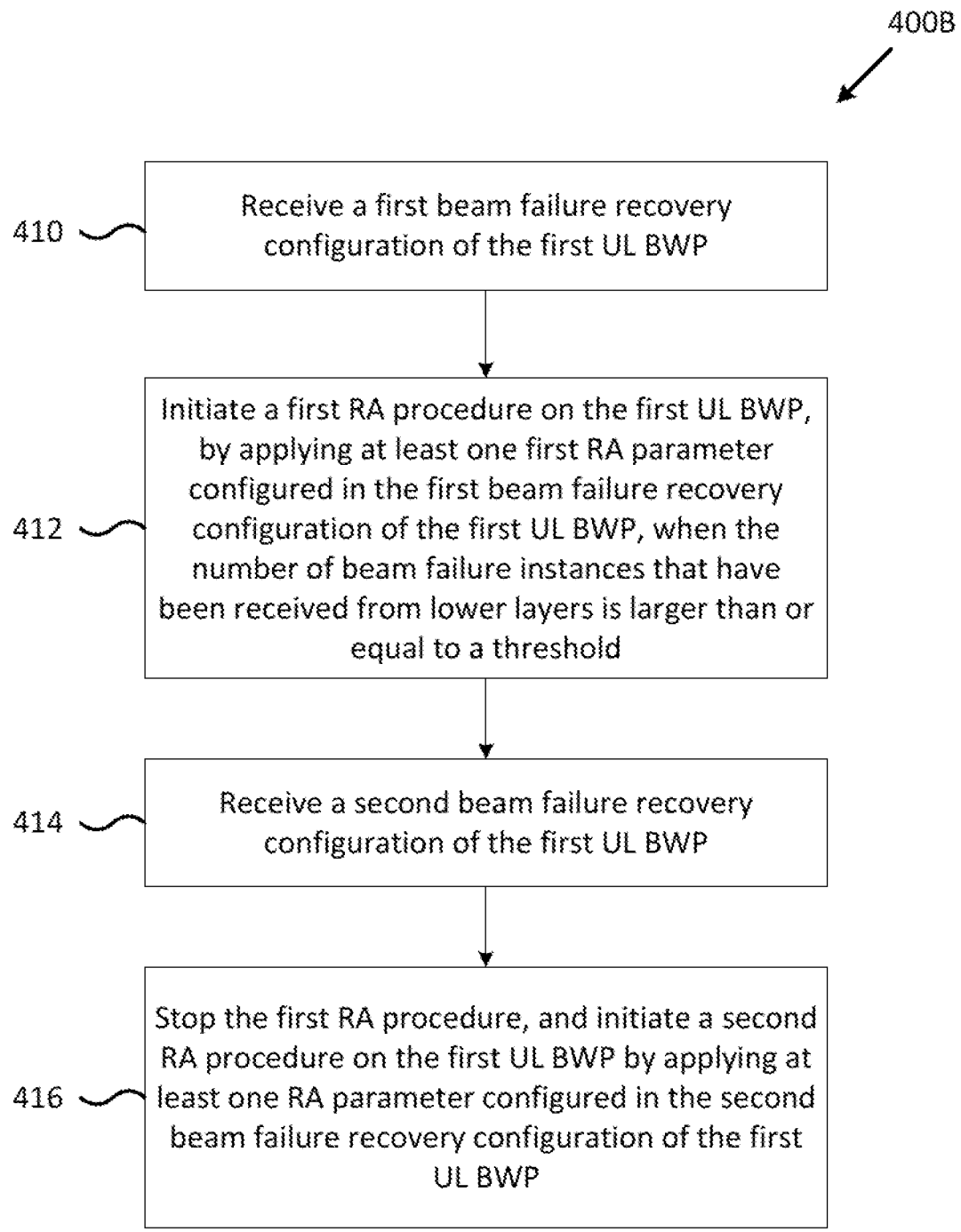
FIG. 4B is a flowchart of another example method performed by a MAC entity of a UE in an RA procedure, according to an example implementation of the present application.

FIG. 4B is a flowchart of another example method 400B performed by a MAC entity of a UE in an RA procedure, according to an example implementation of the present application. In action 410, the MAC entity may receive a first beam failure recovery configuration of a first UL BWP (e.g., BeamFailureRecoveryConfig #1). In action 412, the MAC entity may initiate a first RA procedure on the first UL BWP by applying at least one first RA parameter configured in the first beam failure recovery configuration of the first UL BWP (e.g., BeamFailureRecoverConfig #1), when the number of beam failure instances (e.g., BFI_COUNTER) that have been received from lower layers is larger than or equal to a threshold (e.g., beamFailureInstanceMaxCount). The first RA procedure may be for beam failure recovery.

In action 414, the MAC entity may receive a second beam failure recovery configuration of the first UL BWP (e.g., BeamFailureRecoveryConfig #2). For example, the beam failure recovery configuration of the first UL BWP is reconfigured by a base station. The second beam failure recovery configuration may overwrite the first beam failure recovery configuration. In action 416, the MAC entity may initiate a second RA procedure on the first UL BWP by applying at least one second RA parameter configured in the second beam failure recovery configuration of the first UL BWP (e.g., BeamFailureRecoveryConfig #1). The second RA procedure may be also for beam failure recovery.

Figure 5:
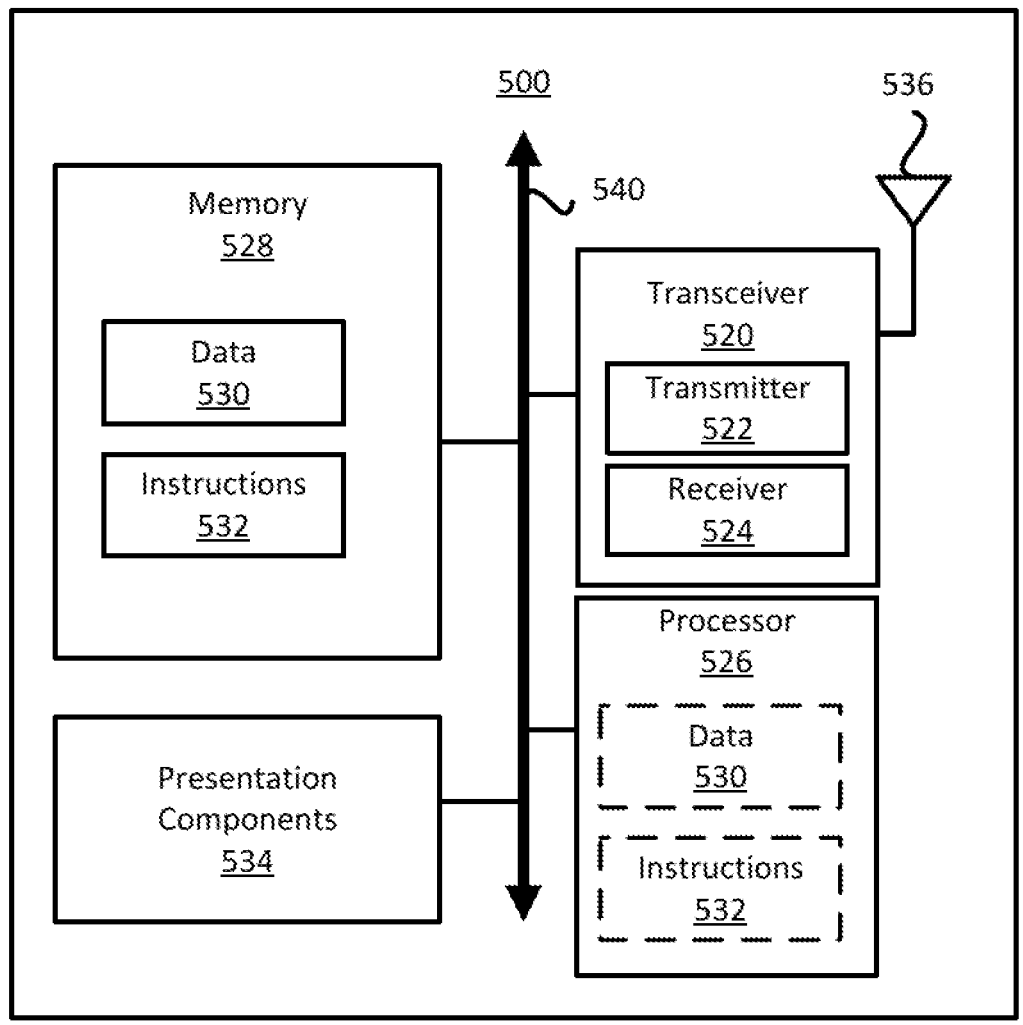
FIG. 5 is a block diagram illustrating a node for wireless communication, according to various aspects of the present application.

FIG. 5 is a block diagram illustrating a node for wireless communication, in accordance with various aspects of the present application. As shown in FIG. 5, a node 500 may include a transceiver 520, a processor 528, a memory 534, one or more presentation components 538, and at least one antenna 536. The node 500 may also include an RF spectrum band module, a base station (BS) communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a base station that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data. Computer storage media includes RAM, ROM. EEPROM, flash memory or other memory technology. CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, and etc. As illustrated in FIG. 5, The memory 534 may store computer-readable, computer-executable instructions 532 (e.g., software codes) that are configured to, when executed, cause the processor 528 to perform various functions described herein, for example, with reference to FIGS. 1 through 4. Alternatively, the instructions 532 may not be directly executable by the processor 528 but be configured to cause the node 500 (e.g., when compiled and executed) to perform various functions described herein.

The processor 528 (e.g., having processing circuitry) may include an intelligent hardware device, e.g., a Central Processing Unit (CPU), a microcontroller, an ASIC, and etc. The processor 528 may include memory. The processor 528 may process the data 530 and the instructions 532 received from the memory 534, and information through the transceiver 520, the base band communications module, and/or the network communications module. The processor 528 may also process information to be sent to the transceiver 520 for transmission through the antenna 536, to the network communications module for transmission to a core network.

One or more presentation components 538 presents data indications to a person or other device. Examples of presentation components 538 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
   one or more non-transitory computer-readable media having computer-executable instructions embodied thereon; and at least one processor coupled to the one or more non-transitory computer-readable media, the at least one processor is configured to execute the computer-executable instructions to:

receive, by a Medium Access Control (MAC) entity of the UE, a first beam failure recovery configuration of a first uplink (UL) bandwidth part (BWP);

receive, by the MAC entity of the UE, a second beam failure recovery configuration of a second UL BWP;

initiate, by the MAC entity of the UE, a first Random Access (RA) procedure on the first UL BWP for notifying a base station of a beam failure occurrence in a serving cell by applying at least one first RA parameter configured in the first beam failure recovery configuration of the first UL BWP when a number of beam failure instances that have been received from lower layers of the UE is larger than or equal to a threshold;

receive a Radio Resource Control (RRC) message that triggers BWP switching before completion of the first RA procedure;

switch, by the MAC entity of the UE, an active UL BWP of the UE from the first UL BWP to the second UL BWP upon receiving the RRC message and before completion of the first RA procedure; and initiate, by the MAC entity of the UE, a second RA procedure on the second UL BWP for notifying the base station of the beam failure occurrence regardless of a number of beam failure instances received after switching the active UL BWP of the UE to the second UL BWP by applying at least one second RA parameter configured in the second beam failure recovery configuration of the second UL BWP, after switching the active UL BWP of the UE to the second UL BWP.

2. The UE of claim 1, wherein the at least one second RA parameter comprises a power ramping step applied for a prioritized RA procedure.

3. The UE of claim 1, wherein the at least one second RA parameter comprises a scaling factor for a backoff indicator (BI).

4. The UE of claim 1, wherein the at least one processor is further configured to execute the computer-executable instructions to:
stop the first RA procedure.

5. The UE of claim 1, wherein the first UL BWP is not configured with Physical Random Access Channel (PRACH) occasions, and the second UL BWP is an initial UL BWP of the UE.

6. A method for random access (RA) performed by a Medium Access Control (MAC) entity of a user equipment (UE), the method comprising:

receiving a first beam failure recovery configuration of a first uplink (UL) bandwidth part (BWP);

receiving a second beam failure recovery configuration of a second UL BWP;

initiating a first Random Access (RA) procedure on the first UL BWP for notifying a base station of a beam failure occurrence in a serving cell by applying at least one first RA parameter configured in the first beam failure recovery configuration of the first UL BWP when a number of beam failure instances that have been received from lower layers of the UE is larger than or equal to a threshold;

receiving a Radio Resource Control (RRC) message that triggers BWP switching before completion of the first RA procedure;

switching an active UL BWP of the UE from the first UL BWP to the second UL BWP upon receiving the RRC message and before completion of the first RA procedure; and initiating a second RA procedure on the second UL BWP for notifying the base station of the beam failure occurrence regardless of a number of beam failure instances received after switching the active UL BWP of the UE to the second UL BWP by applying at least one second RA parameter configured in the second beam failure recovery configuration of the second UL BWP, after switching the active UL BWP of the UE to the second UL BWP.

7. The method of claim 6, wherein the at least one second RA parameter comprises a power ramping step applied for a prioritized RA procedure.

8. The method of claim 6, wherein the at least one second RA parameter comprises a scaling factor for a backoff indicator (BI).

9. The method of claim 6, further comprising:
stopping the first RA procedure.

10. The method of claim 6, wherein the first UL BWP is not configured with Physical Random Access Channel (PRACH) occasions, and the second UL BWP is an initial UL BWP of the UE.

* * * * *